United States Patent
Nakai et al.

(10) Patent No.: US 9,517,459 B2
(45) Date of Patent: Dec. 13, 2016

(54) PHOTOCATALYTIC COATING FILM AND METHOD FOR PRODUCING SAME

(75) Inventors: Toru Nakai, Himeji (JP); Yoshinori Funaki, Himeji (JP); Toshikazu Nakamura, Himeji (JP)

(73) Assignee: DAICEL CORPORATION, Osaka-Shi (JP)

(*) Notice: Subject to any disclaimer, the term of this patent is extended or adjusted under 35 U.S.C. 154(b) by 57 days.

(21) Appl. No.: 14/124,292

(22) PCT Filed: Jun. 6, 2012

(86) PCT No.: PCT/JP2012/065066
§ 371 (c)(1),
(2), (4) Date: Dec. 6, 2013

(87) PCT Pub. No.: WO2012/169660
PCT Pub. Date: Dec. 13, 2012

(65) Prior Publication Data
US 2014/0106961 A1    Apr. 17, 2014

(30) Foreign Application Priority Data
Jun. 7, 2011    (JP) .................................. 2011-127063

(51) Int. Cl.
*B01J 31/38*    (2006.01)
*B01J 37/02*    (2006.01)
(Continued)

(52) U.S. Cl.
CPC .............. *B01J 31/38* (2013.01); *B01J 23/745* (2013.01); *B01J 35/004* (2013.01);
(Continued)

(58) Field of Classification Search
CPC ....................................................... B01J 21/38
See application file for complete search history.

(56) References Cited

U.S. PATENT DOCUMENTS

| 5,489,496 A | 2/1996 | Katayama et al. |
| 6,107,241 A | 8/2000 | Ogata et al. |
| (Continued) | | |

FOREIGN PATENT DOCUMENTS

| JP | 7-84393 A | 3/1995 |
| JP | 9-262481 A | 10/1997 |
| (Continued) | | |

OTHER PUBLICATIONS

Evaluation of titanium dioxide as a photocatalyst for removing air pollutants, 2008, prepared by lawerence berkeley national laboratory.*

(Continued)

*Primary Examiner* — Melvin C Mayes
*Assistant Examiner* — Stefanie Cohen
(74) *Attorney, Agent, or Firm* — Birch, Stewart, Kolasch & Birch, LLP

(57) ABSTRACT

Provided is a photocatalytic coating film that can develop excellent photocatalytic activity and exhibit superior adhesion to an adherend surface.
The photocatalytic coating film is obtained by applying and drying a photocatalytic coating composition containing at least rod-like or needle-like titanium oxide particles and a binder component so that the photocatalytic coating film contains the titanium oxide particles in a content of 0.5 g/m² or more. The photocatalytic coating film contains the titanium oxide particle in a content per unit volume (1 m² by 1 μm thick) of less than 3.0 g. The titanium oxide particles preferably have an aspect ratio of 1.5 or more, the aspect ratio specified as the ratio of a long side length to a short side length of particle. The compositional ratio (by weight) of the titanium oxide particles to the binder component in the photocatalytic coating film is preferably from 1:6 to 30:1.

11 Claims, 4 Drawing Sheets

(51) Int. Cl.
  *B01J 35/00* (2006.01)
  *G02B 27/00* (2006.01)
  *B01J 23/745* (2006.01)
  *B01J 21/06* (2006.01)
  *B01J 35/06* (2006.01)

(52) U.S. Cl.
  CPC ....... *B01J 37/0215* (2013.01); *B01J 37/0219* (2013.01); *G02B 27/0006* (2013.01); *B01J 21/063* (2013.01); *B01J 35/06* (2013.01)

(56) References Cited

U.S. PATENT DOCUMENTS

| | | | |
|---|---|---|---|
| 6,228,480 B1* | 5/2001 | Kimura | B01J 35/002 106/287.13 |
| 6,429,169 B1 | 8/2002 | Ichinose | |
| 7,255,831 B2* | 8/2007 | Wei | B01D 53/8668 204/158.2 |
| 2001/0046937 A1* | 11/2001 | Murasawa | B01J 35/002 502/150 |
| 2003/0050196 A1* | 3/2003 | Hirano et al. | 507/238 |
| 2005/0277543 A1 | 12/2005 | Takahashi et al. | |
| 2007/0237943 A1* | 10/2007 | Wakizaka et al. | 428/328 |
| 2008/0223713 A1* | 9/2008 | Xu et al. | 204/157.15 |
| 2009/0048098 A1* | 2/2009 | Ishibai et al. | 502/227 |
| 2009/0062109 A1* | 3/2009 | Boyd | B01D 53/864 502/159 |
| 2009/0124490 A1* | 5/2009 | Miyazoe et al. | 502/242 |
| 2009/0226620 A1 | 9/2009 | Takahashi et al. | |
| 2012/0132515 A1 | 5/2012 | Ohno | |

FOREIGN PATENT DOCUMENTS

| | | |
|---|---|---|
| JP | 2000-354761 A | 12/2000 |
| JP | 2004-51644 A | 2/2004 |
| JP | 2004-315356 A | 11/2004 |
| JP | 2006-224084 A | 8/2006 |
| JP | 2009-227515 A | 10/2009 |
| JP | 2011-225422 A | 11/2011 |
| WO | WO 2011/016329 A1 | 2/2011 |

OTHER PUBLICATIONS

Murakami et al, Developement of a visible light responsive rutile rod by site selective modification of iiron (III) ion on {1 1 1} exposed crystal faces, applied catalysis B: environmental 97 (2010) pp. 115-119.*

Bae, E. et al., "Exposed crystal surface-controlled TiO2 nanorods having rutile phase from TiCl3 under hydrothermal conditions", Journal of Molecular Catalysis A: Chemical, Nov. 8, 2008, vol. 300, No. 1-2, p. 72-79.

Murakami, N. et al., "Development of a visible-light-responsive rutile rod by site-selective modification of iron(III) ion on {111} exposed crystal faces", Applied Catalysis B: Environmental, Mar. 30, 2010, vol. 97, No. 1-2, p. 115-119.

Ono, T. et al., "Nano Level de Kozo Seigyo sareta Hikari Shokubai no Kaihatsu", Photocatalysis, Jul. 15, 2009, vol. 29, p. 54-63.

PCT/ISA/210—International Search Report mailed on Aug. 7, 2012, issued in PCT/JP2012/065066.

Kiyono, "10.3 Needle-shaped titanium oxide," Titanium Oxide—Physical Property and Applied Technology, Gihodoshuppan, Jun. 25, 1991, p. 270 (4 pages total), with a partial translation.

* cited by examiner (a)

(b)

US 9,517,459 B2

PHOTOCATALYTIC COATING FILM AND METHOD FOR PRODUCING SAME

TECHNICAL FIELD

The present invention relates to a photocatalytic coating film and a method for producing the same, which photocatalytic coating film contains a titanium oxide photocatalyst and can develop actions such as air purification, deodorization, water purification, antimicrobial action, and antifouling action.

BACKGROUND ART

Titanium oxide photocatalysts can exhibit strong oxidation action through the absorption of ultraviolet rays and have been recently used in various applications as follows:
1. air purification by removing environmental pollutants, such as nitrogen oxides (NOx) and sulfur oxides (SOx), which are emitted typically as automobile exhaust gases;
2. deodorization by removing malodor-causative substances such as ammonia, acetaldehyde, hydrogen sulfide, and methyl mercaptan;
3. water purification by decomposing and removing organochlorine compounds such as tetrachloroethylene and trihalomethanes;
4. antimicrobial action by killing microorganisms and further decomposing the dead microorganisms; and
5. antifouling action by decomposing oils to prevent soiling caused by the attachment of sand and dirt to the oils.

Such titanium oxide photocatalysts may be used as suspensions in a solution or as being supported on a substrate. The photocatalytic activity of a photocatalyst is generally in proportional to the surface area thereof, and the suspended titanium oxide photocatalyst has higher activity than that of the supported titanium oxide photocatalyst. However, the latter (supported titanium oxide photocatalyst) is employed more often than the former (suspended titanium oxide photocatalyst) from the viewpoint of practical utility. When the latter is employed, the titanium oxide photocatalyst is supported on a substrate generally by bonding the same with the substrate by the action of a binder component.

When the titanium oxide photocatalyst is bonded with the substrate using a binder component, however, the resulting supported catalyst disadvantageously fails to ensure satisfactory durability. This is because the binder component is decomposed with time through oxidation by the titanium oxide particles, loses its adhesion, and peels off from the substrate surface.

Citation 1 describes that a photocatalytic coating film capable of exhibiting satisfactory adhesion over the long term can be formed by employing granular anatase titanium dioxide as a photocatalyst; and blending the photocatalyst with titanium peroxide serving as a binder component, which titanium peroxide is resistant to decomposition by the titanium dioxide. However, the titanium oxide particles, if embedded in the binder component, exhibit insufficient photocatalytic activity. To prevent this, the coating film preferably has a very small thickness so as to expose the titanium oxide particles from the coating film surface. Still the coating film, unless it has a certain thickness, has insufficient adhesion and fails to be bonded with the substrate surface. Specifically, the coating film disadvantageously hardly has adhesion and photocatalytic activity both at satisfactory levels.

CITATION LIST

Patent Literature

PTL 1: Japanese Unexamined Patent Application Publication (JP-A) No. H09-262481

SUMMARY OF INVENTION

Technical Problem

Accordingly, an object of the present invention is to provide a photocatalytic coating film that can develop excellent photocatalytic activity and can exhibit superior adhesion to an adherend (substrate) surface.

Another object of the present invention is to provide a photocatalytic coating film that can develop excellent photocatalytic activity and has such satisfactory durability as to exhibit superior adhesion to the adherend surface over the long term.

Yet another object of the present invention is to provide a photocatalytic coating film that has responsibility to light in a wide wavelength range from the ultraviolet region to the visible light region, can thereby exhibit high catalytic activity even under sunlight, an incandescent lamp, a fluorescent lamp, or another light source in a regular living space, and has such excellent durability as to exhibit superior adhesion to the adherend surface over the long term.

Solution to Problem

The present inventors made intensive investigations to achieve the objects based on the concept that only a portion of the photocatalyst exposed from the coating film surface can exhibit its catalytic activity because a photocatalytic reaction proceeds upon light irradiation. As a result, they have found as follows. A photocatalytic coating film formed by using rod-like or needle-like titanium oxide particles as a photocatalyst can exhibit extremely high photocatalytic activity even when having such a sufficient thickness as to ensure certain adhesion; this is because the photocatalyst has a bulky shape and, when blended with a binder component, is not embedded in the binder component (pores are not filled in), and can form a coating film being porous and having a rough surface with an extremely large surface area, and this helps the photocatalyst to be exposed from the coating film surface in a dramatically larger amount. The present invention has been made based on these findings.

Specifically, the present invention provides a photocatalytic coating film obtained by applying and drying a photocatalytic coating composition comprising at least rod-like or needle-like titanium oxide particles and a binder component so that the photocatalytic coating film contains the titanium oxide particles in a content of 0.5 g/m$^2$ or more, in which the photocatalytic coating film contains the titanium oxide particles in a content of less than 3.0 g per unit volume (1 m$^2$ by 1 μm thick).

The titanium oxide particles preferably have an aspect ratio of 1.5 or more, where the aspect ratio is specified as a ratio of a long side length (major axis) to a short side length (minor axis) of particle.

The compositional ratio (by weight) of the titanium oxide particles to the binder component is preferably from 1:6 to 30:1.

In a preferred embodiment, the titanium oxide particles are rutile titanium dioxide particles. In another preferred embodiment, the titanium oxide particles are titanium oxide particles bearing a transition metal compound (transition-metal-supported titanium oxide particles).

The transition metal compound is preferably an iron compound.

The transition metal compound is preferably selectively supported on, of exposed crystal faces of the titanium oxide particles, one or more faces acting as an oxidation site; and particularly preferably selectively supported on, of exposed crystal faces of the titanium oxide particles, at least one face selected from the group consisting of the (001) face, the (111) face, and the (011) face.

The binder component preferably contains at least one compound selected from the group consisting of titanium peroxide, silicon compounds, and fluorocarbon resins and particularly preferably contains at least titanium peroxide.

The present invention also provides a method for producing the photocatalytic coating film. This method includes the steps of: preparing a photocatalytic coating composition containing at least rod-like or needle-like titanium oxide particles and a binder component; and applying and drying the photocatalytic coating composition.

The method for producing the photocatalytic coating film preferably further includes the step of allowing the rod-like or needle-like titanium oxide particles to bear a transition metal compound under exciting light irradiation to give rod-like or needle-like titanium oxide particles bearing the transition metal compound.

In addition and advantageously, the present invention provides a photocatalyst-coated article including a substrate and the photocatalytic coating film. The substrate is preferably one made from a plastic material.

Advantageous Effects of Invention

The present invention employs rod-like or needle-like titanium oxide particles as a photocatalyst to be contained in a photocatalytic coating composition and enables the formation of a coating film having superior adhesion by the use of a small amount of a binder component, because the titanium oxide particles have the specific shape and are thereby easily immobilized by the binder component. The photocatalytic coating film according to the present invention can exhibit extremely excellent photocatalytic activity, because the coating film has a large surface area, and this allows a high proportion of the photocatalyst to be exposed from the coating film surface.

The photocatalytic coating film, when employing a binder component containing at least titanium peroxide as the binder component, can maintain extremely excellent photocatalytic activity and superior adhesion to the adherend over the long term, because the binder component itself is resistant to oxidative decomposition by the titanium oxide particles.

The present invention in an embodiment employs, as the photocatalyst, transition-metal-compound-supported titanium oxide particles which include rod-like or needle-like titanium oxide particles and, supported thereon, a transition metal compound. This embodiment particularly enables the formation of a photocatalytic coating film that has responsibility to light in a wide wavelength range from the ultraviolet region to the visible light region and can thereby exhibit high catalytic activity even under sunlight, an incandescent lamp, a fluorescent lamp, or another light source in a regular living space.

DESCRIPTION OF EMBODIMENTS

Titanium Oxide Particles

Figure 1:
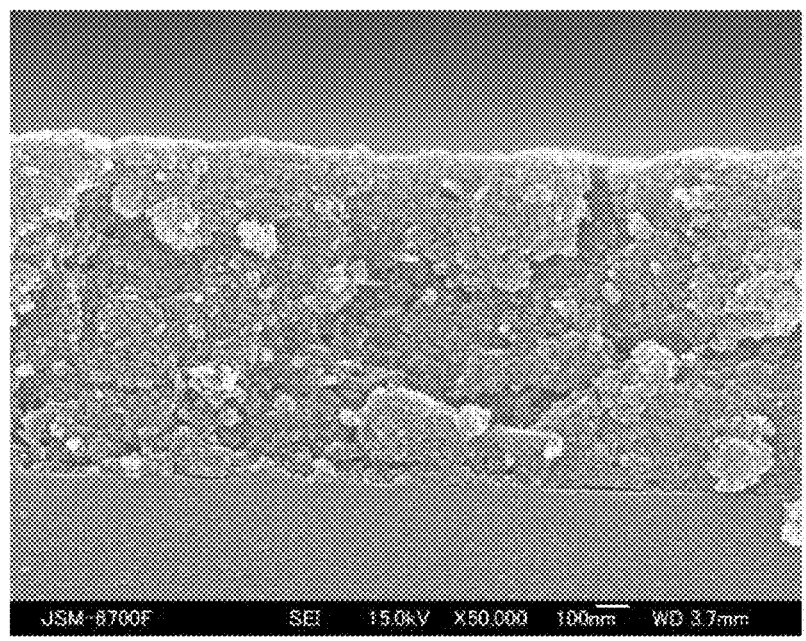
FIG. 1 depicts a scanning electron photomicrograph (a) illustrating a cross section of a photocatalytic coating film using titanium oxide particles having an aspect ratio of 1.5 or more; and a scanning electron photomicrograph (b) illustrating a cross section of a photocatalytic coating film using titanium oxide particles having an aspect ratio of less than 1.5.
Figure 1:
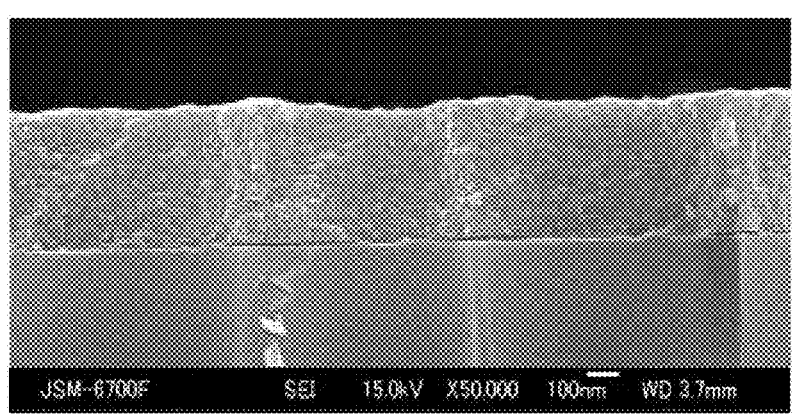

The titanium oxide particles for use in the present invention feature a rod-like or needle-like shape and have an aspect ratio of typically 1.5 or more, preferably from about 1.5 to about 100, particularly preferably from 2.0 to 20, and most preferably from 5.0 to 15, where the aspect ratio is expressed as the ratio of the long side length (major axis) to the short side length (minor axis) of each particle. The aspect ratios of the titanium oxide particles can be determined typically from a scanning electron photomicrograph. The titanium oxide particles, if having an aspect ratio of smaller than the above-specified range (specifically, if having a more spherical shape), are densely filled in and block pores upon blending with a binder component. This causes the resulting photocatalytic coating film to have a smaller surface area, causes the photocatalyst to be exposed from the coating film surface in a smaller amount, and readily causes the photocatalytic coating film to have insufficient photocatalytic activity.

The titanium oxide particles can be exemplified by rutile, anatase, and brookite titanium dioxide particles. Among them, rutile titanium dioxide particles are preferred herein because of having a shape with a large aspect ratio.

The titanium oxide photocatalyst for use herein are preferably titanium oxide particles on which a transition metal compound is supported (transition-metal-compound-supported titanium oxide particles). This is because the transition-metal-compound-supported titanium oxide particles have responsibility to a wide wavelength range from the ultraviolet region to the visible light region and can exhibit high catalytic activity even under sunlight, an incandescent lamp, a fluorescent lamp, or another light source in a regular living space. The transition metal compound may be supported in the form typically of a transition metal ion, a single-element transition metal, a transition metal salt, a transition metal oxide, a transition metal hydroxide, or a transition metal complex.

In a preferred embodiment, the transition metal compound is supported on not all the exposed crystal faces of the titanium oxide particles, but selectively one or more specific faces (e.g., specific one or two faces). This embodiment is preferred because an oxidation site and a reduction site can be more spatially largely separated from each other, this allows an excited electron to be separated more satisfactorily from a hole and minimizes the proceeding of the recombination and reverse reaction between the excited electron and the hole to an extremely low level, and the photocatalyst can exhibit higher photocatalytic activity.

As used herein the phrase "the transition metal compound is selectively supported on one or more specific faces" refers to that more than 50% (preferably 70% or more, and particularly preferably BO % or more) of the total amount of the transition metal compound to be supported on titanium oxide particles having exposed crystal faces is supported on, of two or more exposed crystal faces, not all the faces, but one or more specific faces (e.g., one or two specific faces). Whether the transition metal compound is supported can be determined by identifying or detecting signals derived from (assigned to) the transition metal compound on the exposed crystal faces using a transmission electron microscope (TEM) and/or an energy-dispersive X-ray fluorescence spectrometer (EDX).

The transition metal compound is not limited, as long as having an absorption spectrum in the visible light region and being capable of injecting an electron to the conduction band in an excited state. Among such transition metal compounds, typically preferred are compounds of Groups 3 to 11 elements of the periodic table, of which compounds of Groups 8 to 11 elements of the periodic table are more preferred, and trivalent iron compounds ($Fe^{3+}$) are particularly preferred. This is because the titanium oxide particles readily adsorb such trivalent iron compounds ($Fe^{3+}$), but hardly adsorb divalent iron compounds ($Fe^{2+}$). Using this property, face selectivity can be easily imparted upon supporting of the iron compound onto the titanium oxide particles.

Principal exposed crystal faces of rutile titanium dioxide particles are exemplified by (110), (001), (111), and (011) faces. The rutile titanium dioxide particles for use herein are exemplified by those having (110) and (111) faces; those having (110) and (011) faces; and those having (001), (110), and (111) faces. Among them, preferred for use herein are rutile titanium dioxide particles having (001), (110), and (111) faces. This is because the oxidation site can be more spatially largely separated from the reduction site in the particles, and the proceeding of the recombination and reverse reaction between the excited electron and the hole can be suppressed. In the rutile titanium dioxide having (001), (110), and (111) faces, the (111) face and the (001) face each serve as a face acting as an oxidation site.

Accordingly, of transition-metal-compound-supported titanium oxide particles for use herein, preferred are rutile titanium dioxide particles having (001), (110), and (111) faces, where a transition metal compound is selectively supported on the (001) and (111) faces.

When rutile titanium dioxide particles having (001), (110), and (111) faces are taken as an example, such titanium oxide particles can be synthetically prepared by subjecting a titanium compound to a hydrothermal treatment in an aqueous medium in the presence of a hydrophilic polymer as a structure-controlling agent. The hydrothermal treatment may be performed typically at 100° C. to 200° C. for 3 to 48 hours (preferably 6 to 12 hours). The aqueous medium is exemplified by water; and a mixture of water with a water-soluble organic solvent. The hydrophilic polymer is exemplified by polyvinylpyrrolidones and poly(vinyl alcohols).

The titanium compound is exemplified by trivalent titanium compounds and tetravalent titanium compounds. The trivalent titanium compounds are exemplified by titanium trihalides such as titanium trichloride and titanium tribromide. Of the trivalent titanium compounds for use herein, titanium trichloride ($TiCl_3$) is preferred for its inexpensiveness and high availability.

Exemplary tetravalent titanium compounds for use herein include compounds represented by Formula (I) expressed as follows:

$$Ti(OR)_tX_{4-t} \quad (1)$$

wherein R represents a hydrocarbon group; X represents a halogen atom; and t denotes an integer of from 0 to 3.

The hydrocarbon group as R is exemplified by $C_{1-4}$ aliphatic hydrocarbon groups such as methyl, ethyl, propyl, isopropyl, n-butyl, sec-butyl, and tert-butyl.

The halogen atom as X is exemplified by chlorine, bromine, and iodine.

The tetravalent titanium compounds of this type are exemplified by titanium tetrahalides such as $TiCl_4$, $TiBr_4$, and $TiI_4$; alkoxytitanium trihalides such as $Ti(OCH_3)Cl_3$, $Ti(OC_2H_5)Cl_3$, $Ti(OC_4H_9)Cl_3$, $Ti(OC_2H_5)Br_3$, and $Ti(OC_4H_9)Br_3$; dialkoxytitanium dihalides such as $Ti(OCH_3)_2Cl_2$, $Ti(OC_2H_5)_2Cl_2$, $Ti(OC_4H_9)_2Cl_2$, and $Ti(OC_2H_5)_2Br_2$; and trialkoxytitanium monohalides such as $Ti(OCH_3)_3Cl$, $Ti(OC_2H_5)_3Cl$, $Ti(OC_4H_9)_3Cl$, and $Ti(OC_2H_5)_3Br$. Of tetravalent titanium compounds for use herein, titanium tetrahalides are preferred for their inexpensiveness and high availability, of which titanium tetrachloride ($TiCl_4$) is especially preferred.

Particularly when a tetravalent titanium compound is used as the titanium compound, rutile titanium dioxide particles having (001), (110), and (111) faces can be synthetically prepared by subjecting the tetravalent titanium compound to a hydrothermal treatment even without using a hydrophilic polymer as a structure-controlling agent. The hydrothermal treatment may be performed in an aqueous medium at a reaction temperature of from 110° C. to 220° C. (preferably from 150° C. to 220° C.) under a pressure equal to or higher than the saturated vapor pressure at that reaction temperature for a duration of 2 hours or longer (preferably from 5 to 15 hours).

The rutile titanium dioxide having (001), (110), and (111) faces can also be synthetically prepared by placing rutile titanium dioxide particles having (110) and (111) faces into sulfuric acid and stirring the mixture with heating to erode (dissolve) ridge or vertex portions of the titanium oxide particles. The sulfuric acid is preferably one having a high concentration of 50 percent by weight or more, and is particularly preferably a concentrated sulfuric acid. The rutile titanium dioxide particles having (110) and (111) faces can be synthetically prepared by subjecting a titanium compound to a hydrothermal treatment in an aqueous medium. The hydrothermal treatment may be performed typically at a temperature of from 100° C. to 200° C. for a duration of from 3 to 48 hours (and preferably from 6 to 12 hours). The aqueous medium is exemplified by water; and a mixture of water with a water-soluble organic solvent. A halide is preferably added upon the hydrothermal treatment so as to control the size and surface area of resulting particles.

The titanium oxide particles for use herein have a specific surface area of typically from 20 to 100 m²/g, preferably from 40 to 90 m²/g, and particularly preferably from 50 to 85 m²/g. The titanium oxide particles, if having a specific surface area of less than the above-specified range, may readily have reduced ability to adsorb a reactant and exhibit insufficient photocatalytic activity. In contrast, the titanium oxide particles, if having a specific surface area of more than the above-specified range, may often have inferior separability between the excited electron and the hole and exhibit insufficient photocatalytic activity.

The transition metal compound can be supported on the titanium oxide particles typically by impregnation in which the titanium oxide particles are impregnated with the transition metal compound.

Specifically, the impregnation can be performed by dispersing and immersing the titanium oxide particles in an aqueous solution and adding the transition metal compound to the dispersion with stirring. Typically when a trivalent iron compound ($Fe^{3+}$) is used as the transition metal compound, the impregnation can be performed by adding an iron compound, such as iron(III) nitrate, iron(III) sulfate, or iron(III) chloride, to the dispersion.

The transition metal compound may be added in an amount of typically from about 0.01 to about 3.0 percent by weight, and preferably from 0.05 to 1.0 percent by weight, relative to the amount of the titanium oxide particles. The transition metal compound, if added in an amount of less than the above-specified range, may fail to contribute to sufficient photocatalytic activity because of reduction in amount of the transition metal compound supported on the titanium oxide particle surface. In contrast, the transition metal compound, if added in an amount of more than the above-specified range, may readily suffer from insufficient photocatalytic activity because the excited electron does not effectively act due typically to the reverse electron transfer of an injected electron. The immersion may be performed for a duration of typically from about 30 minutes to about 24 hours, and preferably from 1 to 10 hours.

In a preferred embodiment of the present invention, exciting light is applied during the impregnation of the titanium oxide particles with the transition metal compound. The exciting light, when applied, excites an electron in a valence band of the titanium oxide particles to a conduction band and forms a hole in the valence band and an excited electron in the conduction band. The hole and excited electron diffuse or migrate to the particle surface and are separated from each other according to the properties of the respective exposed crystal faces to form a face acting as an oxidation site and a face acting as a reduction site. When the titanium oxide particles in this state are impregnated with a trivalent iron compound as an example of the transition metal compound, the trivalent iron compound ($Fe^{3+}$) is adsorbed by the face acting as an oxidation site, but is reduced into a divalent iron compound ($Fe^{2+}$) by the face acting as a reduction site. The divalent iron compound ($Fe^{2+}$) has resistance to adsorption and is eluted into the solution. As a result, there can be obtained a transition-metal-compound-supported titanium oxide particles on which the iron compound ($Fe^{3+}$) is supported only on a face(s) acting as an oxidation site.

The exciting light application can be performed by any procedure, as long as being capable of applying light having energy equal to or higher than the band-gap energy, and can be performed typically by applying an ultraviolet ray. The ultraviolet ray application can be performed by using an ultraviolet irradiation device such as an ultraviolet exposure device using a light source capable of efficiently emitting an ultraviolet ray, such as a medium-/high-pressure mercury lamp, an UV laser system, an UV-LED, or a black-light lamp. The exciting light may be applied at an irradiance of typically from about 0.1 to about 300 mW/cm², preferably from 0.5 to 100 mW/cm², and most preferably from 1 to 5 mW/cm². The exciting light may be applied for a duration of typically from about one minute to about 72 hours, and preferably from 30 minutes to 48 hours.

A sacrificial agent may be added upon impregnation herein. The addition of the sacrificial agent allows supporting of the transition metal compound on specific exposed crystal face(s) with a high selectivity in the titanium oxide particle surface. The sacrificial agent for use herein is preferably an electron-releasable organic compound that readily releases an electron. Organic compounds of this type are exemplified by alcohols such as methanol and ethanol; carboxylic acids such as acetic acid; and amines such as ethylenediaminetetraacetic acid (EDTA) and triethanolamine (TEA).

The sacrificial agent may be added in a suitably controllable amount of typically from about 0.5 to about 5.0 percent by weight, and preferably from 1.0 to 2.0 percent by weight, relative to the amount of the titanium oxide solution. The sacrificial agent may be used in excess.

The transition-metal-compound-supported titanium oxide particles obtained by the above method can be separated and purified typically by a separation procedure such as filtration, concentration, distillation, extraction, crystallization, recrystallization, or column chromatography, or a separation procedure as any combination of them.

Binder Component

The binder component for use herein has the function of immobilizing the titanium oxide particles and is exemplified by titanium peroxide, silicon compounds, and fluorocarbon resins.

The silicon compounds are exemplified by halogenated silane compounds such as tetrabromosilane, tetrachlorosilane, tribromosilane, trichlorosilane, dibromosilane, dichlorosilane, monobromosilane, monochlorosilane, dichlorodimethylsilane, dichlorodiethylsilane, dichloromethylsilane, dichloroethylsilane, chlorotrimethylsilane, chlorotriethylsilane, chlorodimethylsilane, chlorodiethylsilane, chloromethylsilane, chloroethylsilane, t-butylchlorodimethylsilane, and t-butylchlorodiethylsilane; and alkoxysilane compounds such as tetramethoxysilane, tetraethoxysilane, trimethoxysilane, triethoxysilane, dimethoxysilane, diethoxysilane, methoxysilane, ethoxysilane, dimethoxy(methyl)silane, diethoxy(methyl)silane, dimethoxy(ethyl)silane, diethoxy(ethyl)silane, methoxydimethylsilane, ethoxydimethylsilane, methoxydiethylsilane, and ethoxydiethylsilane.

The fluorocarbon resins are exemplified by polytetrafluoroethylenes, poly(vinylidene fluoride)s, poly(vinyl fluoride)s, poly(chlorotrifluoroethylene)s, tetrafluoroethylene-hexafluoropropylene copolymers, ethylene-tetrafluoroethylene copolymers, ethylene-chlorotrifluoroethylene copolymers, tetrafluoroethylene-perfluoroalkyl vinyl ether copolymers, perfluorocyclopolymers, vinyl ether-fluoroolefin copolymers, vinyl ester-fluoroolefin copolymers, tetrafluoroethylene-vinyl ether copolymers, chlorotrifluoroethylene-vinyl ether copolymers, urethane-crosslinked tetrafluoroethylenes, epoxy-crosslinked tetrafluoroethylenes, acryl-crosslinked tetrafluoroethylenes, and melamine-crosslinked tetrafluoroethylenes.

The binder component for use herein preferably contains at least titanium peroxide and particularly preferably contains titanium peroxide alone or in combination with a silicon compound or a fluorocarbon resin. This is because the titanium peroxide has high film-formability, can immediately form a coating film having superior adhesion by applying and drying the coating composition, is resistant to decomposition by the photocatalytic activity of the titanium oxide particles, and has such satisfactory durability as to immobilize the titanium oxide particles over the long term.

The titanium peroxide can be synthetically prepared typically by adding a hydrogen peroxide solution to an aqueous solution of a titanium compound such as $TiCl_4$ in the presence of a basic substance. The basic substance is exemplified by ammonia water and sodium hydroxide.

Photocatalytic Coating Composition

The photocatalytic coating composition for use herein contains at least rod-like or needle-like titanium oxide particles as a photocatalyst; and a binder component.

The photocatalytic coating composition may be prepared by any process not limited, as long as the titanium oxide particles and the binder component can be mixed with each other. Typically, the mixing of the titanium oxide particles with the binder component may be performed directly in a dispersion medium; or may be performed by mixing the titanium oxide particles and the binder component separately with a dispersion medium to give sols, and mixing the titanium oxide particle sol with the binder component sol. Typically, the titanium oxide sol can be prepared by dispersing the titanium oxide particles in a dispersion medium, such as water or ethanol, using an agitator bead mill or another known/customary dispersing device. The titanium oxide sol may contain the titanium oxide particles in a content of typically from about 1.0 to about 10.0 percent by weight based on the total amount of the sol. The titanium peroxide sol may contain the titanium peroxide in a content of typically from about 1.00 to 1.60 percent by weight based on the total amount of the sol. The titanium peroxide sol may also be available as a commercial product typically under the trade name of "TiOSKYCOAT-C" (from TiO TECHNO Co., Ltd.).

The titanium oxide particles and the binder component are preferably mixed so that the compositional ratio (by mole) of the titanium oxide particles to the binder component in the photocatalytic costing composition be from about 1:6 to about 30:1, preferably from 1:1 to 15:1, and particularly preferably from 1.5:1 to 13:1. The photocatalytic coating composition, if containing the titanium oxide particles in an amount of less than the above-specified range, may give a photocatalytic coating film having insufficient photocatalytic activity; whereas, if containing the titanium oxide particles in an amount of more than the above-specified range, may give a photocatalytic coating film having insufficient adhesion and often less protecting the adherend from deterioration.

In addition to the titanium oxide particles, binder component, and dispersion medium, the photocatalytic coating composition for use herein may further contain one or more other components according to necessity, which other components are to be generally incorporated in photocatalytic coating compositions and are exemplified by coating auxiliaries. The other component(s) may be incorporated in any amount within a range not adversely affecting advantageous effects of the present invention and is incorporated in an amount of typically about 10 percent by weight or less (e.g., from 0.01 to 10 percent by weight) based on the total amount (100 percent by weight) of the photocatalytic coating composition.

Photocatalytic Coating Film

A photocatalytic coating film according to an embodiment of the present invention is a photocatalytic coating film obtained by applying a photocatalytic coating composition containing at least the rod-like or needle-like titanium oxide particles and the binder component; and drying the applied coating composition so that the photocatalytic coating film contains the rod-like or needle-like titanium oxide particles in a content of 0.5 g/m$^2$ or more. The photocatalytic coating film contains the rod-like or needle-like titanium oxide particles in a content of less than 3.0 g per unit volume (1 m$^2$ by 1 μm thick).

The photocatalytic coating film according to the present invention may be produced at least through steps as follows:

Step 1: the step of preparing a photocatalytic coating composition containing at least rod-like or needle-like titanium oxide particles and a binder component; and Step 2: the step of uniformly spreading and drying the photocatalytic coating composition so as to contain the rod-like or needle-like titanium oxide particles in a content of 0.5 g/m$^2$ or more.

The photocatalytic coating composition can be uniformly spread or applied typically using a spray, brush, roller, or gravure printing. The spread coating composition is dried (to evaporate the dispersion medium) and can thereby immediately form a coating film. The drying may be performed at room temperature or with heating.

In a preferred embodiment of the present invention, transition-metal-compound-supported titanium oxide particles are used as the titanium oxide particles. This is preferred because of imparting visible-light responsibility to the photocatalytic coating film. When the transition-metal-compound-supported titanium oxide particles are employed, the production method preferably further includes, prior to Step 1, the step of supporting a transition metal compound on rod-like or needle-like titanium oxide particles under exciting light irradiation to give transition-metal-compound-supported rod-like or needle-like titanium oxide particles.

The photocatalytic coating composition may be applied in such an amount that the rod-like or needle-like titanium oxide particles be contained in a content of 0.5 g/m$^2$ or more (e.g., from about 0.5 to about 5.0 g/m$^2$, and preferably from 0.5 to 3.0 g/m$^2$). The photocatalytic coating composition, if applied in an amount of less than the above-specified range, may readily give a photocatalytic coating film having insufficient photocatalytic activity.

The photocatalytic coating film according to the present invention contains the rod-like or needle-like titanium oxide particles in a content of less than 3.0 g (e.g., from about 0.5 g to less than about 3.0 g, preferably from 0.5 to 2.5 g, and particularly preferably from 0.7 to 2.0 g) per unit volume (1 m$^2$ by 1 μm thick). The photocatalytic coating film according to the present invention contains the rod-like or needle-like titanium oxide particles and, when mixed with the binder component, are present with a smaller packing density and can form a photocatalytic coating film having a porosity larger than that of a photocatalytic coating film using granular (with an aspect ratio of less than 1.5) titanium oxide particles. The resulting photocatalytic coating film according to the present invention has a rough surface, has a porous structure with a remarkably large surface area, structurally includes the photocatalyst not embedded in the coating film, but largely exposed from the coating film surface, and can exhibit extremely excellent photocatalytic activity (see FIG. 1).

The photocatalytic coating film formed by the method can exhibit extremely high photocatalytic activity and can decompose harmful chemical substances to water and carbon dioxide levels through light irradiation. The photocatalytic coating film is therefore usable in various applications such as antibacterial/antifungal uses, deodorization, air purification, water purification, and antifouling uses. In addition, the photocatalytic coating film excels in adhesion to the adherend surface and durability and can exhibit superior photocatalytic activity over the long term.

Customary photocatalytic coating films cannot exhibit sufficient functions in a room which receives only small amounts of ultraviolet rays and are hardly applied to indoor uses. By contrast, the photocatalytic coating film according to an embodiment of the present invention exhibits gas decomposition capability and antimicrobial action even in a low-light-intensity environment such as in a room and can be applied to wide-range uses including environmental purification in indoor wallpaper, furniture, and other household uses, as well as in public facilities such as hospitals and schools; and contribution to enhanced functionality of household electrical appliances. This is because as follows. The photocatalytic coating film according to this embodiment employs transition-metal-compound-supported rod-like or needle-like titanium oxide particles as the photocatalyst. The photocatalytic coating film thereby has responsibility to light in a wide wavelength range from the ultraviolet region to the visible light region, can absorb even light in a regular living space, typically from sunlight, an incandescent lamp, or a fluorescent lamp, and can exhibit high catalytic activity.

Photocatalyst-Coated Article

A photocatalyst-coated article according to an embodiment of the present invention includes the photocatalytic coating film; and a substrate.

Exemplary methods for producing the photocatalyst-coated article according to the present invention includes a production method of applying a photocatalytic coating composition to the substrate surface and drying the applied coating composition to form a photocatalytic coating film containing the rod-like or needle-like titanium oxide particles in a content of 0.5 g/m$^2$ or more; and a production method of applying the photocatalytic coating composition onto another substrate, drying the applied coating composition to form a photocatalytic coating film containing the rod-like or needle-like titanium oxide particles in a content of 0.5 g/m$^2$ or more, and transferring and applying the formed photocatalytic coating film to the target substrate surface.

The photocatalytic coating composition may be applied to the substrate surface directly, or indirectly through the medium of an under coat. In the latter case, a coating agent containing the binder component (of which titanium peroxide is preferred) is applied to the substrate surface to form an under coat beforehand, and the photocatalytic coating composition is applied on the under coat. The under coat, when provided, completely separates the substrate and the photocatalytic coating film from each other. The under coat completely blocks the substrate from the photocatalytic action and protects the substrate from damage caused by the oxidation of the titanium oxide particles even when the article employs a substrate made from an organic material as the substrate. The under coat, when provided on the substrate surface, has a thickness of typically from about 0.1 to about 1.0 μm, and preferably from 0.2 to 0.5 μm.

Exemplary materials for the substrate constituting the photocatalyst-coated article include, but not limited to, various plastic materials as mentioned below; rubber materials such as natural rubbers, synthetic rubbers, and silicone rubbers; metal materials such as aluminum, copper, iron, and stainless steels; papery materials (e.g., papers and paper-like substances), ligneous materials (e.g., woods, MDF and other wooden boards, and plywood; fibrous materials such as nonwoven fabrics and woven fabrics; leather materials; inorganic materials such as stones and concrete; glass materials; and porcelain materials. The plastic materials are exemplified by olefinic resins including an α-olefin as a monomer component, such as polyethylenes (PEs), polypropylenes (PPs), ethylene-propylene copolymers, and ethylene-vinyl acetate copolymers (EVAs); polyester resins such as poly(ethylene terephthalate)s (PETs), poly(ethylene naphthalate)s (PENs), and poly(butylene terephthalate)s (PBTs); poly(vinyl chloride)s (PVCs); vinyl acetate resins; poly(phenylene sulfide)s (PPSs); amide resins such as polyamides (nylons) and wholly aromatic polyamides (aramids); polyimide resins; and poly(ether ether ketone)s (PEEKs). Of such substrates to constitute the photocatalyst-coated article according to the present invention, substrates made from plastic materials are preferred.

The substrate for use herein is not limited in its intended use and is exemplified by articles where any of antibacterial/antifungal action, deodorization, air purification, water purification, and antifouling action is expected; and films, sheets, and labels or seals to be affixed to the article surfaces. The articles just mentioned above are exemplified by lenses such as spectacle lenses and camera lenses; prisms; members for automobiles, railway vehicles, and other vehicles, such as windowpanes, lighting covers, and rear-view mirrors; building components such as external wall materials, internal wall materials, sashes, and windowpanes; machinery constructional elements; display devices such as traffic control signs; advertising towers; sound barriers such as those for roads and those for railroads; bridges; guard rails; tunnels; insulators; solar cell covers; solar water heater collector covers; lighting apparatuses; bathroom products; bathroom members such as mirrors and bathtubs; kitchenware; kitchen members such as kitchen panels, sinks, range hoods, and ventilating fans; air-conditioning systems; bathroom (toilet) furnishings; and toilet members such as toilet bowls.

The photocatalyst-coated article according to the present invention, as having the photocatalytic coating film, can decompose harmful chemical substances even to water and carbon dioxide levels upon light irradiation. The photocatalyst-coated article can therefore exhibit satisfactory advantageous effects such as antibacterial/antifungal action, deodorization, air purification, water purification, and antifouling action. In addition, the photocatalyst-coated article according to the present invention, as having the photocatalytic coating film having superior adhesion to the substrate and exhibiting excellent durability, can exhibit superior photocatalytic activity over the long term.

In an embodiment, the photocatalyst-coated article employs a photocatalytic coating film containing transition-metal-compound-supported rod-like or needle-like titanium oxide particles as the photocatalyst. The photocatalyst coated article according to this embodiment has responsibility to light in a wide wavelength range from the ultraviolet region to the visible light region and can exhibit advantageous effects such as excellent antibacterial/antifungal action, deodorization, air purification, water purification, and antifouling action even in a low-light-intensity environment in a regular living space, typically under sunlight, an incandescent lamp, or a fluorescent lamp.

EXAMPLES

The present invention will be illustrated in further detail with reference to several examples below, which are by no means intended to limit the scope of the invention.

The adhesion of photocatalytic coating films obtained in Examples and Comparative Examples was evaluated according to JIS K 5400 (cross-cut testing method). The photocatalytic activity (particularly catalytic activity upon visible light irradiation) was evaluated by two methods as follows:

1. Self-cleaning performance test, in which the photocatalytic activity was evaluated according to JIS R 1703-2 (Fine ceramics (advanced ceramics, advanced technical ceramics)-Test method for self-cleaning performance of photocatalytic materials-), except for using a fluorescent lamp as a light source instead of the ultraviolet irradiator.

2. Methylmercaptan decomposing power evaluation, in which the photocatalytic activity was evaluated by applying light to the photocatalytic coating film to allow the film to decompose methyl mercaptan in a gas phase, and evaluating the photocatalytic performance based on a methyl mercaptan decomposition rate.

The methyl mercaptan decomposition rate (%) was determined in the following manner. Each of the photocatalytic coating films (5 cm by 10 cm) obtained in Examples and Comparative Examples was placed in a reactor (Tedlar bag, made from a poly(vinyl fluoride)), one liter of a 70-ppm methyl mercaptan gas was blown into the reactor, and light irradiation (a fluorescent lamp, at 1000 lux) was performed at room temperature (25° C.). Twenty-four (24) hours into the light irradiation, the amount of residual methyl mercaptan in the reactor was measured by using a gas chromatograph (trade name "GC-2010," supplied by Shimadzu Corporation) equipped with a flame photometric detector, the difference in methyl mercaptan concentration between the concentration after the light irradiation and the initial concentration was determined, based on which the decomposition rate (%) was calculated.

Preparation Example 1

Preparation of Rod-Like Titanium Oxide

A commercially available aqueous $TiCl_4$ solution (Practical Grade Reagent supplied by Wake Pure Chemical Industries, Ltd., a diluted hydrochloric acid solution containing about 16.5 percent by weight of Ti) was diluted with ion-exchanged water at room temperature (25° C.) so as to have a Ti concentration of 5.4 percent by weight. The diluted aqueous $TiCl_4$ solution (56 g) was placed in a 100-ml Teflon®-coated autoclave, the autoclave was hermetically sealed and placed in an oil bath, and the temperature of the aqueous $TiCl_4$ solution in the autoclave was raised to 180° C. over 30 minutes. The aqueous $TiCl_4$ solution was held at a reaction temperature of 180° C. and a reaction pressure of 1.0 MPa for 10 hours, and the autoclave was cooled with ice-water. After 3 minutes, the autoclave was opened after checking that the temperature of the $TiCl_4$ aqueous solution in the autoclave reached 30° C. or lower, and a reaction product was retrieved from the autoclave.

Figure 2:
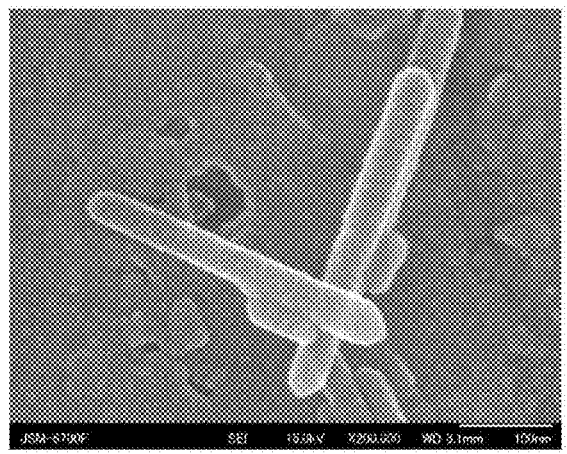
FIG. 2 is a scanning electron photomicrograph of rod-like rutile titanium dioxide particles having the (001), (110), and (111) faces [at 200000-fold magnification with a white scale of 100 nm].

The obtained reaction product was centrifugally separated at 10° C., rinsed with deionized water, subjected to vacuum drying in a vacuum dryer (vacuum oven) at an internal temperature of 65° C. for 12 hours, and yielded 5.2 kg of titanium oxide particles (1). The resulting titanium oxide particles (1) were examined with a scanning electron microscope (SEM) and were found to be rod-like rutile titanium dioxide particles having crystal faces (001), (110), and (111) (aspect ratio: 9.0, specific surface area: 76 $m^2/g$, see FIG. 2).

Figure 3:
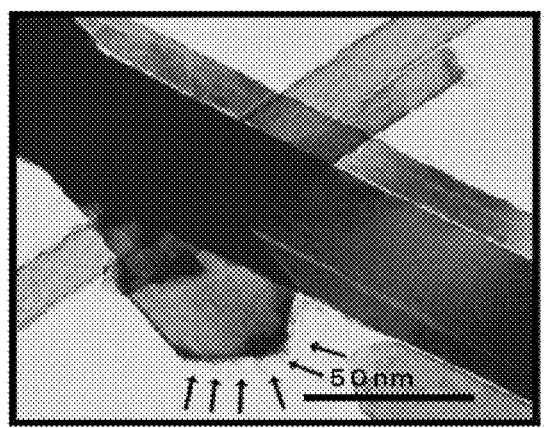
FIG. 3 is a transmission electron photomicrograph illustrating selective supporting of an iron(III) compound on the (001) face and the (111) face of rod-like rutile titanium dioxide particles having (001), (110), and (111) faces.

Separately, an aqueous iron(III) nitrate solution was prepared so as to contain the iron compound in an amount of 0.10 percent by weight relative to the titanium oxide particles (1). The above-prepared titanium oxide particles (1) were dispersed in ion-exchanged water, to which the aqueous iron(III) nitrate solution was added with stirring under light irradiation from a high-pressure mercury lamp controlled at 1.0 $mW/cm^2$. After 6 hours, the resulting particles were collected by centrifugal separation, washed with ion-exchanged water until the ion conductivity reached 6 $\mu S/cm^2$ or less, subjected to vacuum drying, and yielded iron-compound-supported titanium oxide particles (1) (iron compound). The obtained iron-compound-supported titanium oxide particles (1) were examined with a scanning electron microscope (SEM), an energy-dispersive X-ray fluorescence spectrometer (EDX), and a transmission electron microscope (TEM) to find that the iron(III) compound was selectively supported on the (001) and (111) faces of the rod-like rutile titanium dioxide particles having (001), (110), and (111) faces (see FIG. 3).

Preparation Example 2

Preparation of Titanium Oxide Sol

The iron-compound-supported titanium oxide particles (1) obtained in Preparation Example 1 were mixed with and dispersed in water as a dispersion medium using an agitator bead mill (trade name "ULTRA APEC MILL UAM-015," supplied by KOTOBUKI INDUSTRIES CO., LTD.), and yielded a titanium oxide sol (1) having a titanium oxide concentration of 5 percent by weight.

Example 1

An aliquot (60 g) of the titanium oxide sol (1) obtained in Preparation Example 2 was mixed with 40 g of a titanium peroxide sol (trade name "TiOSKYCOAT-C," supplied by TiO TECHNO Co., Ltd., having a titanium peroxide concentration of 1 percent by weight) and yielded a photocatalytic coating composition (1). This had a compositional ratio of the titanium oxide to the titanium peroxide of 3:0.4 (in weight percent).

Figure 4:
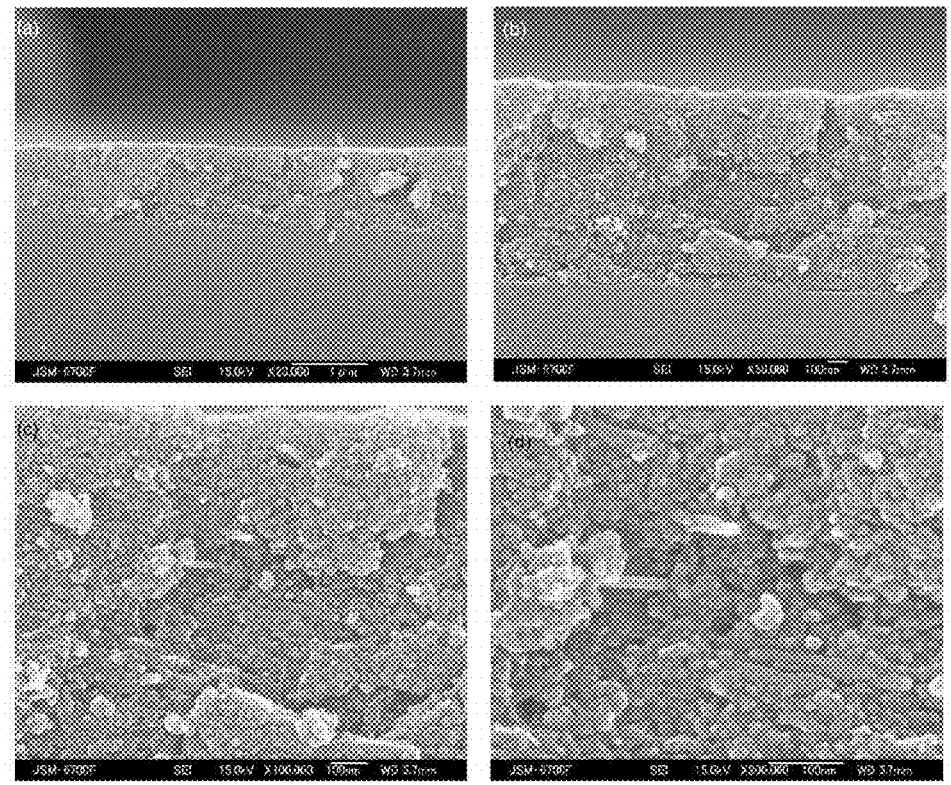
FIG. 4 depicts scanning electron photomicrographs illustrating a cross section of photocatalytic coating film (1) obtained in Example 1 [(a) at 20000-fold magnification with a white scale of 1 μm; (b) at 50000-fold magnification with a white scale of 100 nm; (c) at 100000-magnification with a white scale of 100 nm; and (d) at 200000-fold magnification with a white scale of 100 nm].

The obtained photocatalytic coating composition (1) was applied in several batches using a spray gun to a mass of coating of 50 $g/m^2$, dried at room temperature, and yielded a photocatalytic coating film (1) (titanium oxide particle content: 1.5 $g/m^2$, 1.5 $g/m^2/\mu m$). In the cross-cut test, the photocatalytic coating film remained unpeeled (bonded) in 100 cross cuts out of 100 cross cuts). The photocatalytic coating film had an activity of 4.7 as determined in the self-cleaning performance test and had a thickness of 1.0 μm (see FIG. 4).

Example 2

A photocatalytic coating film (2) (titanium oxide particle content: 1.05 $g/m^2$, 1.31 $g/m^2 \times \mu m$) was obtained by the procedure of Example 1, except for applying the photocatalytic coating composition (1) in a mass of coating of 35 $g/m^2$. In the cross-cut test, the photocatalytic coating film remained unpeeled (bonded) in 100 cross cuts out of 100 cross cuts). The photocatalytic coating film had an activity of 4.2 as determined in the self-cleaning performance test and had a thickness of 0.8 μm.

Example 3

A photocatalytic coating film (2) (titanium oxide particle content: 0.6 $g/m^2$, 1.0 $g/m^2 \times \mu m$) was obtained by the procedure of Example 1, except for applying the photocatalytic coating composition (1) in a mass of coating of 20 g/m². In the cross-cut test, the photocatalytic coating film remained unpeeled (bonded) in 100 cross cuts out of 100 cross cuts). The photocatalytic coating film had an activity of 3.8 as determined in the self-cleaning performance test and had a thickness of 0.6 μm.

Example 4

An aliquot (70 g) of the titanium oxide sol (1) obtained in Preparation Example 2 was mixed with 30 g of a titanium peroxide sol (trade name "TiOSKYCOAT-C," supplied by TiO TECHNO Co., Ltd., having a titanium peroxide concentration of 1 percent by weight) and yielded a photocatalytic coating composition (2). This had a compositional ratio of the titanium oxide to the titanium peroxide of 3.5:0.3 (in weight percent).

The obtained photocatalytic coating composition (2) was applied in several batches using a spray gun to a mass of coating of 43 g/m², dried at room temperature, and yielded a photocatalytic coating film (4) (titanium oxide particle content: 1.5 g/m², 1.5 g/m²/μm). In the cross-cut test, the photocatalytic coating film remained unpeeled (bonded) in 100 cross cuts out of 100 cross cuts). The photocatalytic coating film had an activity of 5.2 as determined in the self-cleaning performance test and had a thickness of 1.0 μm.

Example 5

An aliquot (75 g) of the titanium oxide sol (1) obtained in Preparation Example 2 was mixed with 25 g of a titanium peroxide sol (trade name "TiOSKYCOAT-C," supplied by TiO TECHNO Co., Ltd., having a titanium peroxide concentration of 1 percent by weight) and yielded a photocatalytic coating composition (3). This had a compositional ratio of the titanium oxide to the titanium peroxide of 3.75:0.25 (in weight percent).

The obtained photocatalytic coating composition (3) was applied in several batches using a spray gun to a mass of coating of 30 g/m², dried at room temperature, and yielded a photocatalytic coating film (5) (titanium oxide particle content: 1.05 g/m², 1.31 g/m²/μm). In the cross-cut test, the photocatalytic coating film remained unpeeled (bonded) in 100 cross cuts out of 100 cross cuts). The photocatalytic coating film had an activity of 5.0 as determined in the self-cleaning performance test and had a thickness of 0.8 μm.

Example 6

An aliquot (90 g) of the titanium oxide sol (1) obtained in Preparation Example 2 was mixed with 2 g of tetraethoxysilane and 8 g of ethanol and yielded a photocatalytic coating composition (4). This had a compositional ratio of the titanium oxide to the tetraethoxysilane of 4.5:2 (in mass percent).

The obtained photocatalytic coating composition (4) was applied in several batches using a spray gun to a mass of coating of 30 g/m², dried at room temperature, and yielded a photocatalytic coating film (6) (titanium oxide particle content: 1.35 g/m², 1.13 g/m²/μm). In the cross-cut test, the photocatalytic coating film remained unpeeled (bonded) in 100 cross cuts out of 100 cross cuts). The photocatalytic coating film had an activity of 3.2 as determined in the self-cleaning performance test and had a thickness of 1.2 μm.

Example 7

An aliquot (95 g) of the titanium oxide sol (1) obtained in Preparation Example 2 was mixed with 1 g of tetraethoxysilane and 4 g of ethanol and yielded a photocatalytic coating composition (5). This had a compositional ratio of the titanium oxide to the tetraethoxysilane of 4.75:1 (in mass percent).

The obtained photocatalytic coating composition (5) was applied in several batches using a spray gun to a mass of coating of 28 g/m², dried at room temperature, and yielded a photocatalytic coating film (7) (titanium oxide particle content: 1.33 g/m², 1.02 g/m²/μm). In the cross-cut test, the photocatalytic coating film remained unpeeled (bonded) in 100 cross cuts out of 100 cross cuts). The photocatalytic coating film had an activity of 3.5 as determined in the self-cleaning performance test and had a thickness of 1.3 μm.

Example 8

An aliquot (70 g) of the titanium oxide sol (1) obtained in Preparation Example 2 was mixed with 30 g of an aqueous solution containing 5 percent by weight of a fluorocarbon resin (trade name "nafion," supplied by E.I. du Pont de Nemours & Co.) and yielded a photocatalytic coating composition (6). This had a compositional ratio of the titanium oxide to the fluorocarbon resin of 3.5:1.5 (in mass percent).

The obtained photocatalytic coating composition (6) was applied in several batches using a spray gun to a mass of coating of 40 g/m², dried at room temperature, and yielded a photocatalytic coating film (8) (titanium oxide particle content: 1.4 g/m², 0.93 g/m²/μm). In the cross-cut test, the photocatalytic coating film remained unpeeled (bonded) in 100 cross cuts out of 100 cross cuts). The photocatalytic coating film had an activity of 3.5 as determined in the self-cleaning performance test and had a thickness of 1.5 μm.

Example 9

An aliquot (80 g) of the titanium oxide sol (1) obtained in Preparation Example 2 was mixed with 20 g of an aqueous solution containing 5 percent by weight of a fluorocarbon resin (trade name "nafion," supplied by E.I. du Pont de Nemours & Co.) and yielded a photocatalytic coating composition (7). This had a compositional ratio of the titanium oxide to the fluorocarbon resin of 4.0:1.0 (in mass percent).

The obtained photocatalytic coating composition (7) was applied in several batches using a spray gun to a mass of coating of 35 g/m², dried at room temperature, and yielded a photocatalytic coating film (9) (titanium oxide particle content: 1.4 g/m², 1.08 g/m²/μm). In the cross-cut test, the photocatalytic coating film remained unpeeled (bonded) in 100 cross cuts out of 100 cross cuts). The photocatalytic coating film had an activity of 3.8 as determined in the self-cleaning performance test and had a thickness of 1.3 μm.

Example 10

An aliquot (60 g) of the titanium oxide sol (1) obtained in Preparation Example 2 was mixed with 10 g of a titanium peroxide sol (trade name "TiOSKYCOAT-C," supplied by TiO TECHNO Co., Ltd., having a titanium peroxide concentration of 1 percent by weight) and 30 g of an aqueous solution containing 5 percent by weight of a fluorocarbon resin (trade name "nation," supplied by E.I. du Pont de Nemours & Co.) and yielded a photocatalytic coating composition (8). This had a compositional ratio of the titanium oxide to the titanium peroxide and to the fluorocarbon resin of 3:1.6:1.5 (in mass percent).

The obtained photocatalytic coating composition (8) was applied in several batches using a spray gun to a mass of coating of 50 g/m², dried at room temperature, and yielded a photocatalytic coating film (10) (titanium oxide particle content: 1.5 g/m², 1.25 g/m²/μm). In the cross-cut test, the photocatalytic coating film remained unpeeled (bonded) in 100 cross cuts out of 100 cross cuts). The photocatalytic coating film had an activity of 4.7 as determined in the self-cleaning performance test and had a thickness of 1.2 μm.

Comparative Example 1

A visible-light-responsive titanium oxide (trade name "TPS-201," supplied by Sumitomo Chemical Co., Ltd., aspect ratio: 1.0) was mixed with and dispersed in water as a dispersion medium using an agitator bead mill (trade name "ULTRA APEC MILL UAM-015," supplied by KOTOBUKI INDUSTRIES CO., LTD.), and yielded a titanium oxide sol (2) having a titanium oxide concentration of 5 percent by weight.

Figure 5:
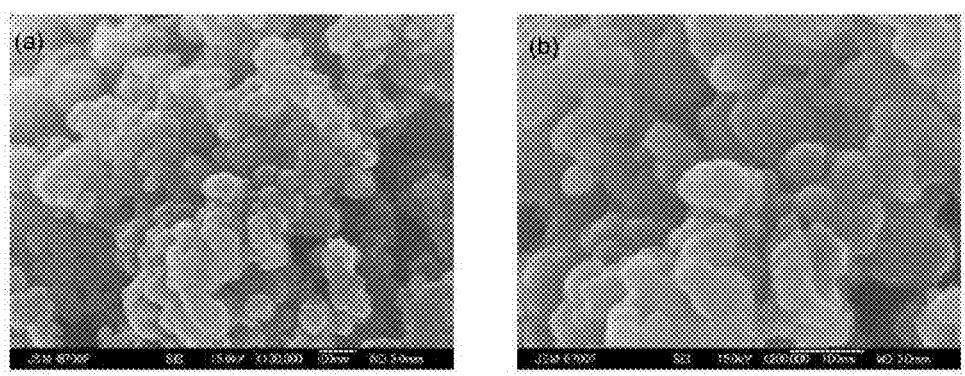
FIG. 5 depicts scanning electron photomicrographs illustrating a cross section of photocatalytic coating film (11) obtained in Comparative Example 1 [(a) at 100000-fold magnification with a white scale of 100 nm; and (b) at 200000-fold magnification with a white scale of 100 nm].

A photocatalytic coating film (11) (titanium oxide particle content: 1.5 g/m², 3.0 g/m²/μm) was obtained by the procedure of Example 1, except for using the titanium oxide sol (2) instead of the titanium oxide sol (1) obtained in Preparation Example 2. In the cross-cut test, the photocatalytic coating film remained unpeeled (bonded) in 100 cross cuts out of 100 cross cuts). The photocatalytic coating film had an activity of 2.0 as determined in the self-cleaning performance test and had a thickness of 0.5 μm (see FIG. 5).

Comparative Example 2

A photocatalytic coating film (12) (titanium oxide particle content: 0.6 g/m², 3.0 g/m²/μm) was obtained by the procedure of Example 3, except for using the titanium oxide sol (2) instead of the titanium oxide sol (1) obtained in Preparation Example 2. In the cross-cut test, the photocatalytic coating film remained unpeeled (bonded) in 100 cross cuts out of 100 cross cuts). The photocatalytic coating film had an activity of 1.9 as determined in the self-cleaning performance test and had a thickness of 0.2 μm.

Comparative Example 3

A visible-light-responsive titanium oxide (trade name "MPT-623," supplied by ISHIHARA SANGYO KAISHA, LTD., aspect ratio: 1.0) was mixed with and dispersed in water as a dispersion medium using an agitator bead mill (trade name "ULTRA APEC MILL UAM-015," supplied by KOTOBUKI INDUSTRIES CO., LTD.), and yielded a titanium oxide sol (3) having a titanium oxide concentration of 5 percent by weight.

Figure 6:
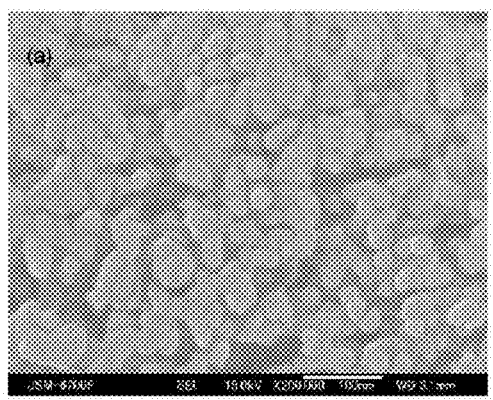
FIG. 6 depicts scanning electron photomicrographs illustrating a cross section of photocatalytic coating film (13) obtained in Comparative Example 3 [(a) at 200000-fold magnification with a white scale of 100 nm; and (b) at 100000-fold magnification with a white scale of 100 nm].
Figure 6:
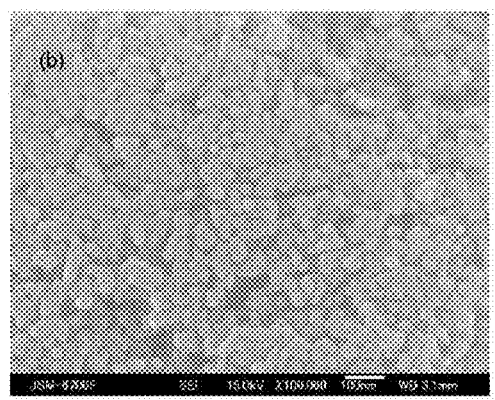

A photocatalytic coating film (13) (titanium oxide particle content: 1.5 g/m², 3.0 g/m²/μm) was obtained by the procedure of Example 1, except for using the titanium oxide sol (3) instead of the titanium oxide sol (1) obtained in Preparation Example 2. In the cross-cut test, the photocatalytic coating film remained unpeeled (bonded) in 100 cross cuts out of 100 cross cuts). The photocatalytic coating film had an activity of 0.5 as determined in the self-cleaning performance test and had a thickness of 0.5 μm (see FIG. 6).

Comparative Example 4

A photocatalytic coating film (14) (titanium oxide particle content: 0.6 g/m², 3.0 g/m²/μm) was obtained by the procedure of Example 3, except for using the titanium oxide sol (3) instead of the titanium oxide sol (1) obtained in Preparation Example 2. In the cross-cut test, the photocatalytic coating film remained unpeeled (bonded) in 100 cross cuts out of 100 cross cuts). The photocatalytic coating film had an activity of 0.4 as determined in the self-cleaning performance test and had a thickness of 0.2 μm.

The following table provides a summary of the results.

TABLE 1

| | Titanium oxide particle content (g) | | | |
|---|---|---|---|---|
| | per 1 m² | per 1 m² by 1 μm thick | Adhesion | Photocatalytic activity |
| Example 1 | 1.5 | 1.5 | 100/100 | 4.7 |
| Example 2 | 1.05 | 1.31 | 100/100 | 4.2 |
| Example 3 | 0.6 | 1.0 | 100/100 | 3.8 |
| Example 4 | 1.5 | 1.5 | 100/100 | 5.2 |
| Example 5 | 1.05 | 1.31 | 100/100 | 5.0 |
| Example 6 | 1.35 | 1.13 | 100/100 | 3.2 |
| Example 7 | 1.33 | 1.02 | 100/100 | 3.5 |
| Example 8 | 1.4 | 0.93 | 100/100 | 3.5 |
| Example 9 | 1.4 | 1.08 | 100/100 | 3.8 |
| Example 10 | 1.5 | 1.25 | 100/100 | 4.7 |
| Comparative Example 1 | 1.5 | 3.0 | 100/100 | 2.0 |
| Comparative Example 2 | 0.6 | 3.0 | 100/100 | 1.9 |
| Comparative Example 3 | 1.5 | 3.0 | 100/100 | 0.5 |
| Comparative Example 4 | 0.6 | 3.0 | 100/100 | 0.4 |

Example 11

An aliquot (69.4 g) of the titanium peroxide sol (1) obtained in Preparation Example 2 was mixed with 30.1 g of a titanium peroxide sol (trade name "TiO TECHNO SKYCOAT-C," supplied by Tio TECHNO Co., Ltd., having a titanium peroxide concentration of 1 percent by weight) and 0.58 g of a fluorochemical surfactant (trade name "FC-4330," supplied by Sumitomo 3M Limited) and yielded a photocatalytic coating composition (9). This had a compositional ratio of the titanium oxide to the titanium peroxide to the fluorochemical surfactant of 3:0.26:0.5 (in weight percent). This was applied to a corona-discharged surface of a transparent PET using a wire bar coater #10 and yielded a photocatalytic-coating-film-coated plastic substrate (1). The photocatalytic coating film in the prepared photocatalytic-coating-film-coated plastic substrate (1) had a titanium oxide particle content of 0.6 g/m² and 1.5 g/m²/μm and had a thickness of 0.3 μm. In the cross cut test, the photocatalytic coating film remained unpeeled from (bonded to) the substrate in 100 cross cuts out of 100 cross cuts. The photo-catalytic-coating-film-coated plastic substrate had an activity of 4.4 as determined in the self-cleaning performance test and had a decomposition rate (%) after 24 hours of 100% as determined in the methyl mercaptan decomposing power evaluation.

Example 12

A photocatalytic-coating-film-coated plastic substrate (2) was obtained by the procedure of Example 11, except for using a wire bar coater #20 instead of the wire bar coater #10. The photocatalytic coating film in the prepared photocatalytic-coating-film-coated plastic substrate (2) had a titanium oxide particle content of 1.2 g/m² and 1.7 g/m²/μm and had a thickness of 0.6 μm. In the cross cut test, the photocatalytic coating film remained unpeeled from (bonded to) the substrate in 100 cross cuts out of 100 cross cuts. The photocatalytic-coating-film-coated plastic substrate had an activity of 4.6 as determined in the self-cleaning performance test and had a decomposition rate (%) after 24 hours of 100% as determined in the methyl mercaptan decomposing power evaluation.

Comparative Example 5

A photocatalytic-coating-film-coated plastic substrate (3) was obtained by the procedure of Example 11, except for using the titanium oxide sol (2) obtained in Comparative Example 1 instead of the titanium oxide sol (1) obtained in Preparation Example 2. The photocatalytic coating film in the obtained photocatalytic-coating-film-coated plastic substrate (3) had a titanium oxide particle content of 0.8 g/m² and 3.5 g/m²/μm and had a thickness of 0.3 μm. In the cross cut test, the photocatalytic coating film remained unpeeled from (bonded to) the substrate in 100 cross cuts out of the entire 100 cross cuts. The photocatalytic-coating-film-coated plastic substrate had an activity of 1.7 as determined in the self-cleaning performance test and had a decomposition rate (%) after 24 hours of 55% as determined in the methyl mercaptan decomposing power evaluation.

The data obtained in Examples and Comparative Examples demonstrate that the photocatalytic coating films and photocatalyst-coated articles according to embodiments of the present invention had photocatalytic activity and adhesion to the adherend (substrate) surface both at superior levels. By contrast, the data further demonstrate that the photocatalytic coating films using titanium oxide particles having an aspect ratio of less than 1.5 as a photocatalyst had significantly inferior photocatalytic activity when having such a thickness as to ensure adhesion to the adherend surface.

INDUSTRIAL APPLICABILITY

The photocatalytic coating films according to the present invention have satisfactory adhesion to the adherend surface, have a large surface area, include the photocatalyst as exposed from the coating film surface in a large amount, and can exhibit extremely excellent photocatalytic activity. When employing a binder component containing at least titanium peroxide as the binder component, the photocatalytic coating films can maintain extremely excellent photocatalytic activity and superior adhesion to the adherend over the long term. In an embodiment, transition-metal-compound-supported titanium oxide particles including rod-like or needle-like titanium oxide particles and, supported thereon, a transition metal compound are employed as the photocatalyst. This embodiment can give a photocatalytic coating film capable of exhibiting high catalytic activity even under sunlight, an incandescent lamp, a fluorescent lamp, or another light source in a regular living space.

The invention claimed is:

1. A photocatalytic coating film obtained by applying and drying a photocatalytic coating composition comprising at least rod-shaped or needle-shaped titanium oxide particles and a binder component so that the photocatalytic coating film contains the titanium oxide particles in a content of 0.5 to 3.0 g/m², the photocatalytic coating film containing the titanium oxide particles in a content of less than 3.0 g per unit volume (1 m² by 1 μm thick) and having a porous structure, the titanium oxide particles being rutile titanium dioxide particles bearing a transition metal compound, the transition metal compound being selectively supported on, of exposed crystal faces of the titanium oxide particles, (111) face acting as an oxidation site.

2. The photocatalytic coating film according to claim 1, wherein the titanium oxide particles have an aspect ratio of 1.5 or more, the aspect ratio specified as a ratio of a long side length to a short side length of particle.

3. The photocatalytic coating film according to one of claims 1 and 2, wherein the photocatalytic coating film has a compositional ratio (by weight) of the titanium oxide particles to the binder component of from 1:6 to 30:1.

4. The photocatalytic coating film according to claim 1, wherein the transition metal compound is an iron compound.

5. The photocatalytic coating film according to claim 1, wherein the binder component comprises at least one compound selected from the group consisting of titanium peroxide, silicon compounds, and fluorocarbon resins.

6. The photocatalytic coating film according to claim 1, wherein the binder component comprises at least titanium peroxide.

7. A method for producing the photocatalytic coating film of claim 1, the method comprising the steps of:
preparing a photocatalytic coating composition comprising at least rod-shaped or needle-shaped titanium oxide particles and a binder component, the titanium oxide particles being rutile titanium dioxide particles bearing a transition metal compound, the transition metal compound being selectively supported on, of exposed crystal faces of the rutile titanium oxide particles, (111) face acting as an oxidation site; and
applying and drying the photocatalytic coating composition.

8. The method for producing the photocatalytic coating film, according to claim 7, further comprising the step of supporting a transition metal compound on rod-shaped or needle-shaped rutile titanium dioxide particles under exciting light irradiation to give rod-shaped or needle-shaped rutile titanium dioxide particles bearing the transition metal compound, the transition metal compound being selectively supported on, of exposed crystal faces of the rutile titanium dioxide particles, (111) face acting as an oxidation site.

9. A photocatalyst-coated article comprising: a substrate; and the photocatalytic coating film of claim 1.

10. The photocatalyst-coated article according to claim 9, wherein the substrate is made from a plastic material.

11. The photocatalytic coating film according to claim 1, having a thickness of 1.5 μm or less.

* * * * *